L. T. SCOVEL.
DRAFT EQUALIZER.
APPLICATION FILED AUG. 6, 1909.
1,036,351.
Patented Aug. 20, 1912.
2 SHEETS—SHEET 1.
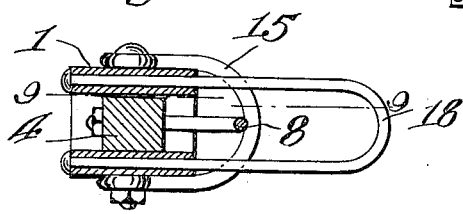
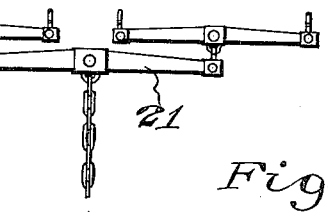
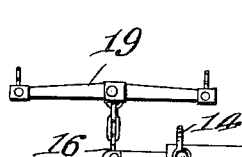
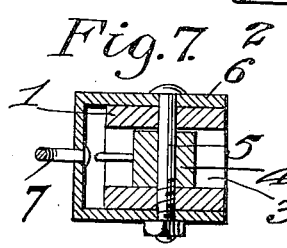
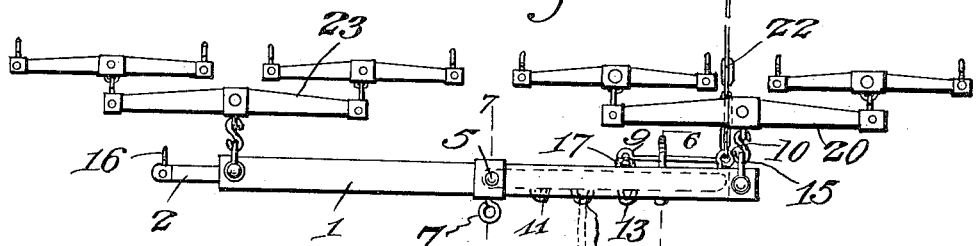
Witnesses:
Joe. P. Wahler.
E. M. Ricketts.
Inventor
L. T. Scovel
By Walter E. Coleman
Attorney
COLUMBIA PLANOGRAPH CO., WASHINGTON, D. C.

L. T. SCOVEL.
DRAFT EQUALIZER.
APPLICATION FILED AUG. 6, 1909.
1,036,351.
Patented Aug. 20, 1912.
2 SHEETS—SHEET 2.
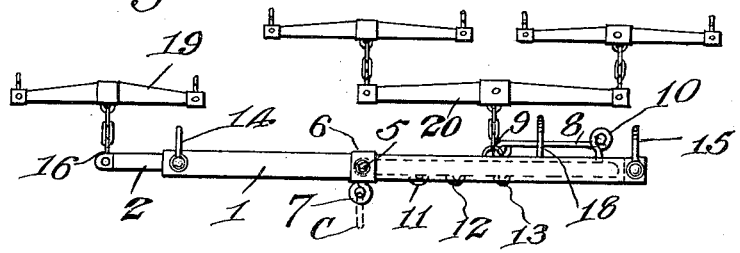
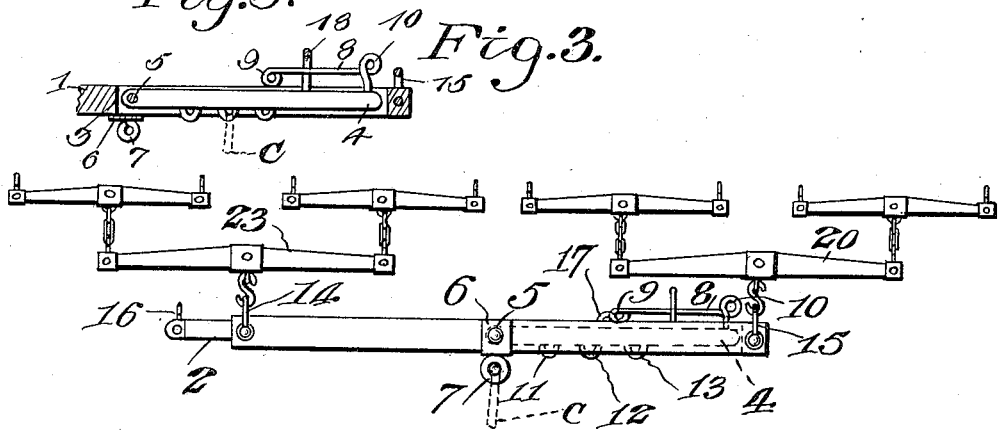
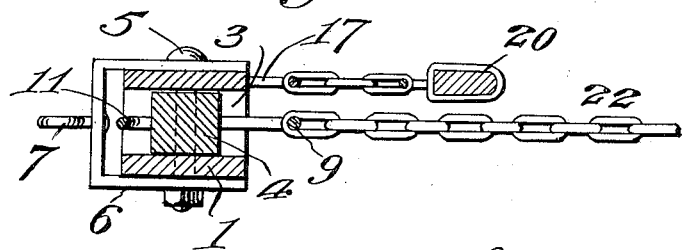
Witnesses:
Jos. P. Wahler
E. M. Ricketts
Inventor
L. T. Scovel
By Watson E. Coleman
Attorney

UNITED STATES PATENT OFFICE.

LEONARD T. SCOVEL, OF WOLSEY, SOUTH DAKOTA.

DRAFT-EQUALIZER.

1,036,351.

Specification of Letters Patent.   Patented Aug. 20, 1912.

Application filed August 6, 1909.   Serial No. 511,603.

*To all whom it may concern:*

Be it known that I, LEONARD T. SCOVEL, a citizen of the United States, residing at Wolsey, in the county of Beadle and State of South Dakota, have invented certain new and useful Improvements in Draft-Equalizers, of which the following is a specification, reference being had to the accompanying drawings.

This invention relates to improvements in draft equalizers.

The principal object of the invention is to provide a simple, practical and effective device of this character which will be compact and which will allow the animals to be hitched close to the implement or machine.

Another object of the invention is to provide a device of this character which may be adapted for use in connection with any number of draft animals.

With the above and other objects in view the invention consists of the novel construction, combination and arrangement of parts, hereinafter fully described and claimed, and illustrated in the accompanying drawings in which—

Figure 1 is a plan view of my improved draft equalizer showing it arranged for five animals. Fig. 2 is a similar view showing it arranged for six animals. Fig. 3 is a similar view showing it arranged for four animals. Fig. 4 is a similar view showing it arranged for three animals. Fig. 5 is a detail section taken on the plane indicated by the line 5—5 in Fig. 1. Figs. 6 and 7 are detail sections taken respectively on the planes indicated by the lines 6—6 and 7—7 in Fig. 2. Fig. 8 is a detail perspective view of one end of the main draft or evener bar, and Fig. 9 is a detail section taken on the plane indicated by the line 9—9 in Fig. 6.

The invention comprises a main draft bar or evener bar 1 having at one of its ends a reduced extension 2, and at its other end a longitudinally extending, horizontally disposed opening 3 within which is pivoted an equalizer bar 4. The latter swings horizontally in the slot or opening 3 and is pivoted at one end on a vertical pivot 5 arranged approximately at the center of the evener bar 1. The pivot 5 also serves to connect to the evener bar a U-shaped clip 6 having at its rear an eye 7. Fixed to the front face of the outer or free end of the equalizer bar 4 is a right-angular bracket 8, the long arm of which extends inwardly along the front face of the bar 4 and terminates in an eye 9. The short arm of the bracket 8 has upon it a similar eye 10, the purpose of which eyes will hereinafter appear. Upon the rear face of the equalizer bar 4 are arranged three eyes 11, 12, 13, and upon the ends of the evener bar 1 are forwardly projecting eyes or clips 14, 15. An eye or clip 16 is also provided on the outer end of the extension 2. 17 denotes an eye arranged on the front edge of the slotted end of the evener bar 1. 18 denotes a U-shaped guide and stop projecting forwardly from the slotted end of the evener bar 1 and adapted to limit the swinging movement of the equalizer bar 4.

In using the invention the implement or machine to which it is applied may be attached by a suitable connection indicated at C to any of the eyes clips or hooks 7, 11, 12, 13, while the double trees or swingle trees may be attached to any of the eyes clips or hooks 16, 14, 9, 10, 15. When used for five animals as shown in Fig. 1 the connection C is applied to the eye 11, a swingle tree 19 is applied to the hook or eye 16, a double tree 20 is connected to the eye 17 and a double tree 21 is connected by a long draft chain 22 to the eye 9 at the end of the offset arm or bracket 8. It will be seen that owing to the offset of the bracket 8 the chain 22 will be disposed between the swingle trees on the double tree 20. When six animals are to be attached to the equalizer a double tree 23 is substituted for the swingle tree 19 and attached to the eye 14, as shown in Fig. 2, the double tree 20 is attached to the eye 15 and the chain 22 of the double tree 21 is attached to the eye 10. In this case the connection C is moved to the eye 12 on the equalizer bar 4. When four animals are to be used the device is used as an ordinary four horse evener, the two double trees 23, 20 being attached respectively to the eyes or clips 14, 15 and the connection C is engaged with the eye 7. When three animals are to be used the double tree 20 is attached to the eye 17, the swingle tree 19 is attached to the hook 16 of the extension 2, and the connection C is applied to the eye 7, as shown in Fig. 4.

From the foregoing description taken in connection with the drawing it is thought that the use and advantages of the invention will be readily understood without a more detailed explanation. It may be noted, however, that the peculiar construction of the device renders it exceedingly compact and enables the animals to be hitched close to the implement or machine. Another decided advantage of the invention arises from the equalizer bar 4 being approximately half the length of the evener bar 1 being disposed in the slot of the latter for free swinging movement. This construction gives the lead animals a long purchase and the offset bracket or arm 8 throws the lead chain between the animals in rear of the lead animals.

While I have shown and described in detail the preferred embodiment of my invention, I wish it understood I do not limit myself to the precise construction set forth, since various changes in the form, proportion and arrangement of parts, and in the details of construction, may be made within the spirit and scope of the invention.

Having thus described the invention what I claim is:

1. A device of the character described comprising a main draft or evener bar, an equalizer bar pivoted at one of its ends adjacent the center of said evener bar, an offset bracket attached to the outer end of the equalizer bar and extending inwardly along the front face of the same, and connections upon the front and rear faces of said bars for the attachment of draft animals and the implement or machine.

2. A device of the character described comprising a main draft or evener bar having one of its ends formed with a longitudinal opening or slot, a horizontal swinging equalizer bar pivoted in said slot at the center of the evener bar, an offset attaching bracket upon the front face of the outer end of the equalizer bar and extending inwardly along the same, and a forwardly projecting stop loop upon the evener bar and adapted to limit the swinging movement of the equalizer bar.

3. A device of the character described comprising a main draft or evener bar having a longitudinal slot at one end, an equalizer bar pivoted at the center of the evener bar for horizontal swinging movement in its slot, an offset attaching bracket on the front face of the outer end of the equalizer bar and extending inwardly along the same, said bracket having connections adjacent its opposite ends, a longitudinal series of connections upon the rear face of said equalizer bar, a rearwardly extending connection at the center of the evener bar, forwardly extending connections at the ends of the evener bar, an extension at one end of the evener bar and provided with a connection, and a forwardly extending connection on the intermediate portion of the slotted end of the evener bar.

4. A device of the character described comprising a main draft or evener bar having at one end a longitudinal opening extending from front to rear, an equalizer bar having its inner end pivoted in the inner end of said opening, a right angular bracket having a short rearwardly extending arm fixed to the outer end of said equalizer bar, the long arm of said bracket being parallel with said equalizer bar and extending inwardly, draft devices attached to the main evener bar adjacent its ends, and another draft device having a lead chain connected to said right angular bracket and extending centrally through one of the first mentioned draft devices.

5. A device of the character described comprising a main draft or evener bar having at one end a longitudinal opening extending from front to rear, an equalizer bar having its inner end pivoted in the inner end of said opening, a right angular bracket having a short rearwardly extending arm fixed to the outer end of said equalizer bar, the long arm of said bracket being parallel with said equalizer bar and extending inwardly, means upon the rear edge of said equalizer bar for the attachment of a clevis, draft trees attached to the main evener bar adjacent its ends, and another draft tree having a lead chain connected to said right angular bracket whereby it will extend centrally across one of the first mentioned draft trees.

In testimony whereof I hereunto affix my signature in the presence of two witnesses.

LEONARD T. SCOVEL.

Witnesses:
A. M. CHENOWETH,
R. F. CHENOWETH.

Copies of this patent may be obtained for five cents each, by addressing the "Commissioner of Patents, Washington, D. C."